United States Patent [19]

Pritchard

[11] Patent Number: 4,583,113
[45] Date of Patent: Apr. 15, 1986

[54] PROGRESSIVE SCAN TELEVISION DISPLAY SYSTEM EMPLOYING INTERPOLATION IN THE LUMINANCE CHANNEL

[75] Inventor: Dalton H. Pritchard, Princeton, N.J.

[73] Assignee: RCA Corporation, Princeton, N.J.

[21] Appl. No.: 526,700

[22] Filed: Aug. 26, 1983

[51] Int. Cl.[4] .............................................. H04N 9/64
[52] U.S. Cl. ....................... 358/11; 358/12; 358/37
[58] Field of Search .................. 358/11, 12, 13, 16, 358/21 R, 36, 37, 140, 166, 167

[56] References Cited

U.S. PATENT DOCUMENTS

| | | | |
|---|---|---|---|
| 4,364,090 | 12/1982 | Wendland | 358/140 |
| 4,400,719 | 8/1983 | Powers | 358/21 R |
| 4,415,931 | 11/1983 | Dischert | 358/242 |
| 4,426,661 | 1/1984 | Okada | 358/140 |
| 4,429,327 | 1/1984 | Oakley | 358/12 |
| 4,480,267 | 10/1984 | van den Avoort | 358/140 |
| 4,509,071 | 4/1985 | Fujimura | 358/11 |
| 4,521,802 | 6/1985 | Ikeda | 358/11 |
| 4,550,336 | 10/1985 | Sepp | 358/11 |
| 4,558,347 | 12/1985 | Pritchard | 358/11 |

FOREIGN PATENT DOCUMENTS 2111343  6/1983  United Kingdom .

OTHER PUBLICATIONS

"High Definition Television Studies on Compatible Basis With Present Standards" by Broder Wendland in Television Technology in the 80's, published by the SMPTE, pp. 151-161 (1981).

Paper "A Motion Adaptive High-Definition Converter for NTSC Color TV Signals" Achiha et al., May 1983, 13th International Television Symposium in Montreux, Achiha et al.

"Development of New TV Receiver Digital Television Adaptable to New Media" Sony Corp., Aug. 15, 1983.

Primary Examiner—Michael A. Masinick
Attorney, Agent, or Firm—P. J. Rasmussen; P. M. Emanuel; R. G. Coalter

[57] ABSTRACT

A flat-field television image having reduced visibility of horizontal scan lines is generated by receiving first and second fields of interlaced video and progressively generating a scanned image within a time for one incoming field. The progressively scanned image includes interpolation and double-rate translation in the luminance channel and double-rate translation only in the chrominance channel. In one embodiment the two-times translation (each line repeated) is applied to the chrominance channel after separation from the luminance but prior to demodulation. In another embodiment the chrominance signal is two-times translated prior to demodulation thus requiring demodulation after double-rate translation.

15 Claims, 3 Drawing Figures

|                      |                              |                            |                        |                        |
|---------------------:|:----------------------------:|:--------------------------:|:----------------------:|:----------------------:|
| WRITE                |                              |                            |                        |                        |
| INTERPOLATED         | $I_{n-1}+I_n$ (DELAY 33)     | $I_n+I_{n+1}$ (DELAY 35)   | $I_{n+1}+I_{n+2}$ (33) | $I_{n+2}+I_{n+3}$ (35) |
| UNMODIFIED           | $I_n$ (DELAY 24)             | $I_{n+1}$ (DELAY 31)       | $I_{n+2}$ (29)         | $I_{n+3}$ (31)         |

READ (VIA SWITCH 45)  $|I_{n-2}+I_{n-1}|$ $I_{n-1}$ $|I_{n-1}+I_n|$ $I_n$ $|I_n+I_{n+1}|$ $I_{n+1}$ $|I_{n+1}+I_{n+2}|$ $I_{n+2}$ $t_0\ \ t_1\ \ t_2\ \ t_3\ \ t_4\ \ t_5\ \ t_6\ \ t_7\ \ t_8$

*Fig. 2*

PROGRESSIVE SCAN TELEVISION DISPLAY SYSTEM EMPLOYING INTERPOLATION IN THE LUMINANCE CHANNEL

This invention relates to television systems and, more particularly, to television display apparatus, such as a television receiver, having reduced visibility of line-scan artifacts resulting from interlaced scanning.

BACKGROUND OF THE INVENTION

Television receivers and monitors presently in use do not give the best pictures which are possible within the constraints of existing line-scanning standards. It is desirable to provide subjective improvements to produce a "high fidelity" display. This problem is discussed in detail in the article "High Definition Television Studies on Compatible Basis with Present Standards" by Broder Wendland which appears in the book "Television Technology in the 80's" published by the SMPTE pp. 151–61 (1981).

A major problem with interlaced scanning television systems such as the 525 line-per-frame, 30 frame-per-second (525/30) NTSC system or with the 625/25 PAL system is the artifacts which are derived from the line-scan process. The artifacts arise mainly due to the interlace process in the standards. This process divides the 525-line picture or frame into two successive 262½-line fields. The 262½ lines of one field are scanned in 1/60th of a second followed by scanning of an additional 262½ lines of another field with the second field lines occupying the spaces between the lines of the first field. The subjective effect of this interlaced scan is to create an apparent vertical drift of the lines of the raster as a function of vertical motion. The apparent drift is more easily seen when viewing a wide-screen display at close range.

An arrangement for increasing the vertical resolution of the television system in a manner compatible with standard PAL and NTSC systems is described in U.S. Pat. No. 4,429,327 to C. B. Oakley et al. In this system the line-scan signals are generated at double-rate and transmitted as a sum signal which is compatible with standard-rate line-scan systems and a difference signal which is necessary to reconstruct the information of the high-resolution double-line-rate signal. The difference signal is conveyed to the receiver by concealing it in a portion of the color signal or by providing a separate channel. Such a system decreases the visibility of the scan lines, but requires the existence of a transmitter and a receiver which may require amendments to broadcast standards.

Recent interests in the development of high definition television systems (HDTV) has been directed to techniques intended to enhance the subjective performance of present systems within the constraints of existing standards. One approach, a technique referred to as progressive scan, has been described in the literature. The incoming signal in a conventional two-to-one vertical interlaced format is stored in an appropriate memory and subsequently displayed in a non-interlaced or progressive line-scan manner. For example, in the case of NTSC, all 525 lines are displayed in 1/60th of a second followed by a repeat of the same 525 lines to complete the total frame time in 1/30th of a second. Progressive scan results in the elimination of artifacts of "interline flicker" and "line break-up with motion" that exists in conventional two-to-one interlaced displays.

The subjective effect is a flicker-free, "smooth" or "quiet", picture presentation that is more pleasing to the viewer. Techniques for implementing progressive scan display systems include the use of field and/or frame memory elements along with the appropriate two-times scan rate output buffers. Other approaches have also been developed that do not require a full field memory but rather require only a few lines of memory (e.g., four per channel) along with an interpolation technique and two-times scan rate commutating buffers. Illustratively, U.S. Pat. No. 4,400,719 in the name of K. H. Powers, describes one such system. The line store plus interpolation approach has the advantage of requiring considerably less memory, however, it is an approximation of the idealized field memory approach in that the interpolated line information may be in error depending upon the degree of complexity involved in the interpolation process. Such line interpolation systems generally include separate interpolation applied to either the individual red (R), green (G) and blue (B) signals or to the individual luminance (Y) and color difference (I and Q) signals subsequent to decoding in the receiver.

SUMMARY OF THE INVENTION

In accordance with the present invention a simplified line-memory interpolation system is provided that minimizes or eliminates some of the performance defects of other approaches as well as reducing the total amount of memory required. This is accomplished in a manner which provides subjectively pleasing picture performance.

In accordance with one aspect of the present invention a color television system for producing a progressively scanned image comprises a source of television signals representing luminance and chrominance of an image raster-scanned in an interlaced fashion. Luminance time compression means, coupled to the source of television signals, divides the duration of each line of the luminance-representative signal by a first predetermined factor. Chrominance time-compression means, coupled to the source of signals, reduces the time duration of each line of the chrominance representative signals by a second predetermined factor forming time-compressed chrominance signals and replicates each line of the time-compressed chrominance signals to form a continuous stream of time-compressed replicated chrominance representative signals. Coupled to receive the luminance-representative signals is an interpolating means. The interpolating means generates lines of signals representative of an estimate of signals which would represent the image between time-successive lines of the signals of the source of television signals. Further the system includes display means, coupled to the luminance and chrominance time-compression means and to the interpolating means, for displaying, by progressive scanning, lines of video derived from the chrominance time compression means and from the luminance time compression means.

BRIEF DESCRIPTION OF THE DRAWING

In the drawing:

FIG. 2 is a timing diagram for use in explaining the operation of FIG. 1; and

DETAILED DESCRIPTION OF THE PREFERRED EMBODIMENTS

Figure 1:
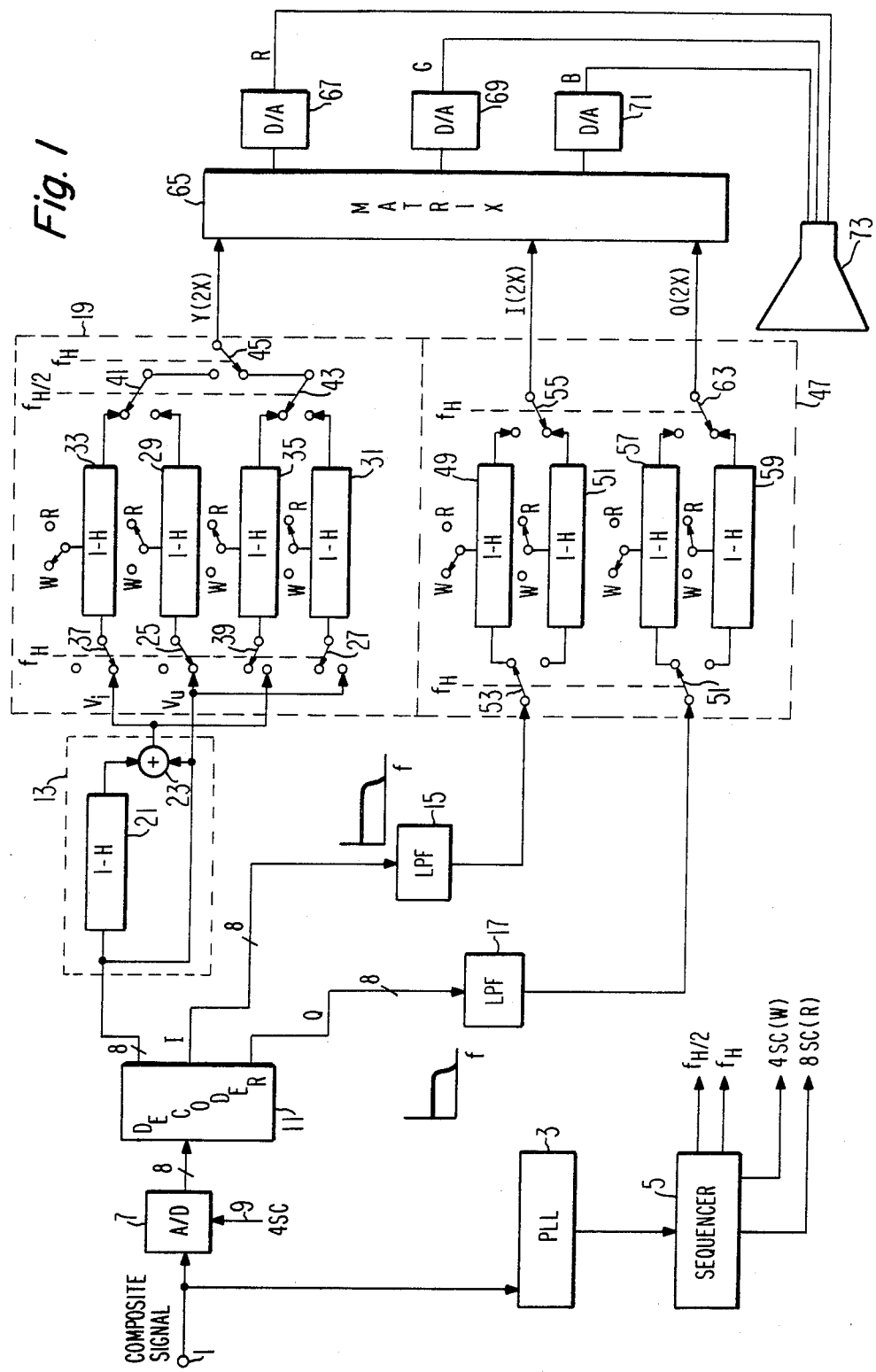
FIG. 1 is a block diagram of a first embodiment of a progressive scan television receiver arranged in accordance with the principles of the present invention.

Referring to FIG. 1, an analog composite interlaced-scan color television signal is applied to terminal 1 from a source (not shown). The source of the analog signal may be the demodulated output of the intermediate-frequency (IF) stage of a standard television receiver. It should be noted that the present invention will be described with reference to an NTSC composite, or component, interlaced color television signal, however, it should be obvious to one of skill in the art that other composite interlaced color television systems, such as PAL, fall within the scope of the invention described herein. The composite signal is applied to phase-locked loop block 3 for deriving sync and clock signals for timing the various operations of the FIG. 1 arrangement. The signals from phase-locked-loop 3 which may include, illustratively, some multiples of the 3.58 MHz color subcarrier and 15.7 KHz horizontal line sync signals are applied to sequencer 5 which provides timing signals to the various operations of FIG. 1 in the proper sequence and at the proper time for controlling the operation thereof. Sequencer 5 provides at least four timing signals: the horizontal line rate signal $f_H$ (illustratively, 15,734 Hz), the horizontal line rate divided by two $f_H/2$, four-times the color subcarrier frequency (illustratively, 4×3.58 MHz) and eight times the color subcarrier frequency (illustratively, 8×3.58 MHz). The combined hardware of phase-locked loop block 3 and sequencer 5 may include an oscillator in a phase-locked loop signal configuration synchronized to the incoming signal; a divider chain for producing timing and control signals and counter means for addressing the digital memory elements. Illustratively, in an NTSC system having a clock rate of four-times the color subcarrier frequency, there are 910 picture elements in each horizontal memory line.

Simultaneously, the composite signal from terminal 1 is applied to analog-to-digital converter 7 where it is converted to digital form under the control of a clock signal which is four-times the subcarrier (4sc) applied to terminal 9 from sequencer 5. The digital signal from analog-to-digital converter 7 is a sequence of 8-bit numbers representative of the analog value of the composite signal. The digitized composite video signal is applied to NTSC decoder 11 which separates the luminance signal (Y) and the two chrominance signals (I, Q) from each other and applies them to interpolator 13 and to low pass filters 15 and 17, respectively. The digitized luminance signal is applied to interpolator 13 which produces interstitial estimated lines for application to the two-times speed-up block 19. Interpolator 13 comprises 1H delay 21 and adder 23. Interpolator 13 is a two point interpolator for providing an estimate of the interstitial lines by forming an average of the signal value of the signal from two adjacent lines. Interpolator 13 produces a succession of simultaneous lines of interpolated video $V_i$ and passes through lines of unmodified video $V_u$. The interpolated video $V_i$ is the sum (including some weighting factor to form an average value) of the current video line (unmodified) and a delayed video line which has been delayed by the 1H delay 21 (the time for one horizontal line is about 63 µs according to NTSC). The unmodified video is applied alternately via switches 25 and 27 controlled by sequencer 5 to 1H delay lines 29 and 31 of the two-times speed-up block 19. Similarly, the interpolated video is applied alternately to 1 H delay lines 33 and 35 via switches 37 and 39, respectively, which are also controlled by sequencer 5. The 1 H delay lines 21, 29, 31, 33 and 35 illustratively may comprise first-in-first-out (FIFO) buffers. In a sampled data system these devices may be CCD delay lines. The buffers within the two-times speed-up block 19 are arranged for accepting input signals clocked in a first rate and for reading out the signal at a rate different from the first rate (illustratively, twice the first rate). The double-rate operation during read-out increases the bandwidth of the signal by a factor of two and also shortens the duration of the signals by a factor of two. Consequently, each line of video which normally occurs in approximately 63 µs and which is written into a buffer in 63 µs is readout of the buffer in about 31.5 µs. In general, delays 29, 31, 33 and 35 are clocked-in at the four-times subcarrier rate (4sc) and readout at the eight-times subcarrier rate (8sc). To produce continuous video, switches 41 and 43 which are operated by sequencer 5 at one-half of the horizontal line frequency (at $f_{H/2}$) are set to select the delay line to be read out and switch 45 which operates at the horizontal line rate $f_H$ controlled by sequencer 5 selects the twice rate Y signal to provide continuous luminance which is alternately unmodified and interpolated.

The operation of interpolator 13 and two-times speed-up block 19 will be explained with reference to the timing diagram of FIG. 2. Assume that just before time $t_0$ delay 35 is loaded with interpolated line $l_{n-2}+l_{n-1}$ and delay 31 is loaded with unmodified line $l_{n-1}$. At time $t_0$, just before the beginning of receipt of line $l_n$, switches 37 and 25 are positioned to pass interpolated line $l_{n-1}+l_n$ and unmodified line $l_n$ to delays 33 and 29, respectively, switches 39 and 27 are in the open position, switches 41 and 43 are positioned to connect delays 33 and 35, respectively, to switch 45 and switch 45 is positioned to connect switch 43 to matrix 65. During the interval $t_0$-t, one half of interpolated line $l_{n-1}+l_n$ and unmodified line $l_n$ are clocked into delays 33 and 29, respectively, and interpolated line $l_{n-2}+l_{n-1}$ is clocked out of delay 35 at twice rate to matrix 65. At time $t_1$, switches 41 and 43 are positioned to connect delays 29 and 31, respectively, to switch 45. During the interval $t_1$-$t_2$ the remaining half of lines $l_{n-1}+l_n$ and $l_n$ are clocked into delays 33 and 29, and unmodified line $l_{n-1}$ is clocked out of delay 31 to matrix 65. At time $t_2$ switches 25 and 37 are positioned to an open position and switches 39 and 27 are switched to pass interpolated line $l_n+l_{n+1}$ and unmodified line $l_{n+1}$ to delays 35 and 31, respectively, switches 41 and 43 are positioned to connect delays 33 and 35, respectively, to switch 45 and switch 45 is positioned to connect delay 33 to matrix 65. During the interval $t_2$-$t_3$ one-half of interpolated line $l_n+l_{n+1}$ and unmodified line $l_{n+1}$ are clocked into delays 35 and 31 respectively, while interpolated line $l_{n-1}+l_n$ is clocked out at twice rate via switches 41 and 45 to matrix 65. At time $t_3$ switches 41 and 43 are repositioned to couple delays 29 and 31, respectively, to switch 45. During the interval $t_3$-$t_4$ remaining half of line $l_n+l_{n+1}$ and line $l_{n+1}$ are clocked into delays 35 and 33, respectively, while unmodified line $l_n$ is clocked out of delay 29 at twice rate via switches 41 and 45 to matrix 65. Thus switches 25, 27, 37, 39 and 45 remain in one position for an interval of $1/f_H$ and in the other position for an interval of $1/f_H$ or are switched at a rate of $f_H$ while switches 41 and 43 remain in one position for an interval $2/f_H$ and in the other for $2/f_H$ or are switched at a rate of $F_H/2$. Another illustration of speed-up processor 19, interpolator 13 and sequencer 5 which requires the use of delay lines that operate at one-half of the speed of the delay lines of FIG. 1 on read-out is provided in U.S. patent application Ser. No. 526,701 filed concurrently herewith in the name of W. E. Sepp.

The I signal from decoder 11 is low pass filtered in low pass filter 15, which may be implemented by digital techniques, to a bandwidth of illustratively 1.5 MHz for an NTSC signal. It should be noted that all of the filters described herein may be implemented by digital techniques. The Q signal is low pass filtered in low pass filter 17 to a bandwidth, illustratively, of 0.5 MHz in an NTSC system. The low pass filtered I and Q signals are applied to the two-times speed-up block 47. Lines of the low pass filtered I signal are applied alternately to 1H delay lines 49 and 51 via switch 53 controlled at the horizontal line rate by sequencer 5. The buffers 49 and 51 which may be RAM type devices are clocked in at a first rate and readout twice at a higher rate, i.e., at two-times the input rate. Thus, alternate lines of the I signal are switched between delay lines 49 and 51, which are written in at four-times the subcarrier rate (4sc). The output of switch 55 which is operated at the horizontal line rate, and controlled by sequencer 5, is a speeded-up signal. In other words, the output of switch 55 is a continuous I signal at twice the rate of the input I signal with each line repeated twice. Thus the effect of switches 53 and 55 and delays 49 and 51 is to provide a continuous I signal read-out twice consecutively at twice the incoming rate. In another arrangement each delay line 49 and 51 could comprise two 1-H CCD type buffers which are simultaneously written into at the slow rate and successively clocked out at the higher rate to form repeated time compressed I-signal. Similarly, the Q signal is written into 1H delays 57 and 59 (which may be RAM type devices) via switch 51 at a first clock-in rate which is illustratively four-times the subcarrier (4sc) and readout via switch 63 at a rate of twice the write rate, illustratively, eight times the subcarrier (8sc) to produce a Q signal which is continuous, twice the rate of the input Q signal and each line repeated. Thus, a continuous Q signal is provided which has been read-out twice consecutively at twice the incoming rate. The separate double-rate Y, I and Q signals are matrixed in matrix circuit 65 which generates twice-rate R, G and B signals. The R, G and B signals which are digitized are applied to digital-to-analog converters 67, 69 and 71, respectively, to produce R, G and B analog output signals. The R, G and B analog signals at the output of D-to-A's 67, 69 and 71 which are two-times the bandwidth of standard definition signals are applied to a display unit 73 including a kinescope operated at, illustratively, a 31.5 KHz rate for scanning a total of 525 lines in a progressive scan manner.

Thus, the arrangement of FIG. 1 produces and displays 525 lines of progressively scanned or non-interlaced video for each 262½-line field of interlaced incoming video. Such an image more closely approximates the appearance of a flat-field display (a display not having subjectively visible scan lines).

This approach provides interpolation and double-rate translation in the luminance channel plus double-rate translation (no interpolation) in the chrominance channel. The block diagram of FIG. 1 provides a luminance signal interpolated and doubled-in-speed and alternated between an unmodified and an interpolated line. The demodulated chrominance components are individually doubled-in-speed and matrixed with luminance at two-times to form the two-times rate R, G and B component signals to operate a display whose horizontal scan rate has been doubled (illustratively, increased from 15.734 KHz to 31.468 KHz).

Another embodiment of interpolation and double-rate translation in the luminance channel and double-rate translation (no interpolation) in the chrominance channel will be described with reference to FIG. 3. The two-times translation (each line repeated) may be applied to the individual I and Q baseband signals after demodulation in accordance with FIG. 1 or to the chrominance signal after separation from the luminance signal but prior to demodulation of the chrominance into its I and Q components. This latter method will be described with reference to FIG. 3.

An analog composite interlaced-scan color television signal is applied to terminal 1 from a source. In the FIGURES, elements designated with like reference numerals are the same or similar items in the various FIGURES. As noted above the source of the analog signal may be the demodulated output of an IF stage of a standard television receiver. Further, the FIG. 3 embodiment will also be described with reference to an NTSC composite interlaced color television signal. The composite signal is applied to sequencer 5 via phase-locked-loop 3. The sequencer 5 provides timing signals to the various operations of FIG. 3 in the proper sequence and at the proper time for controlling the operations thereof. In the FIG. 3 arrangement sequencer 5 provides at least five timing signals: the horizontal line rate signal $f_H$, the horizontal line rate signal divided by two, two-times the color subcarrier frequency (illustratively, $2 \times 3.58$ MHz), four-times the color subcarrier frequency and eight times the color subcarrier frequency. As will be described herein the two-times subcarrier signal (2sc) is used as a reference carrier for demodulating the double-rate chrominance signal into its components, i.e., double-rate I and Q signals.

Simultaneously, the composite signal from terminal 1 is applied to analog-to-digital converter 7 where the analog composite signal is digitized to an 8-bit number at four-times the subcarrier frequency (4sc). The digitized composite signal is applied to comb filter 10 where the composite signal is combed to produce a luminance signal (Y) which is applied to interpolator 13 from conductor 12 and a chrominance signal C, which is applied to bandpass filter 18, illustratively about the 3.58 MHz subcarrier via conductor 14. The luminance signal is interpolated in interpolator 13 and two-times speeded-up in two-times speed-up block 19 and applied to matrix 65 in a fashion similar to that described with reference to FIGS. 1 and 2. The interpolator 13 and two-times speed-up block 19 will not be described with reference to FIG. 3 since their operation is the same as that of blocks 13 and 19 of FIG. 1, respectively.

The chrominance signal, on the other hand, is handled differently from that of the FIG. 1 arrangement. According to FIG. 3, the chrominance signal is two-times speeded-up prior to demodulation and then demodulated to the I and Q components. As noted above, the chrominance signal on conductor 14 is applied to bandpass filter 18. In filter 18, it is bandpass filtered illustratively, about the 3.58 MHz subcarrier by digital techniques. The bandpass filtered chrominance signal is applied to the two-times speed-up block 46. The bandpass filter chrominance signal is applied alternately to 1H delay lines 48 and 50 which may be RAM type devices via switch 52 controlled at the horizontal line rate $f_H$ by sequencer 5. The 1H delay lines 48 and 50 which are similar to those described with reference to the two-times speed-up block 47 of FIG. 1 are clocked in at a first rate and read out at a higher rate, in this example, they are clocked in at 4sc and read out at 8sc. Thus, by switching alternate lines of the chrominance signal between delay lines 48 and 50, written in at four-times the subcarrier frequency, the output through switch 54, which is operated at the horizontal line frequency $f_H$, and controlled by sequencer 5, has the effect of speeding up the signal so that the output of switch 54 is a continuous chrominance signal at two-times the rate of the input chrominance signal and each line repeated. The double-rate chrominance signal from two-times speed-up block 46 is applied to bandpass filter 56 for bandpass filtering, illustratively, about a frequency two-times the color subcarrier frequency (2×3.58 MHz). The bandpass chrominance signal is then applied to demodulator 58 for demodulating the chrominance signal to double-rate component I and Q signals. The phase of the reference signal, for example, 2×3.58 MHz, must be switched 180° at the horizontal line rate, i.e., 15.734 KHz, in order to maintain proper demodulation reference for the two lines of chrominance repeated at twice rate. In another arrangement the reference signal may be held constant while the chrominance signal components are phase reversed 180° at the line rate. Thus, the two-times subcarrier signal and the one-half horizontal line rate signal from sequencer 5 is applied to switch 60 for providing the reference signal switch 180° at the horizontal rate to demodulator 58. The separate double-rate Y, I and Q signals are matrixed in matrix circuit 65 to generate twice-rate R, G and B signals. As described above the R, G and B signals are applied to digital-to-analog converters 67, 69 and 71, respectively, to produce analog R, G and B output signals having double bandwidth for application to a display unit 73 for display in a progressive scan format.

Figure 3:
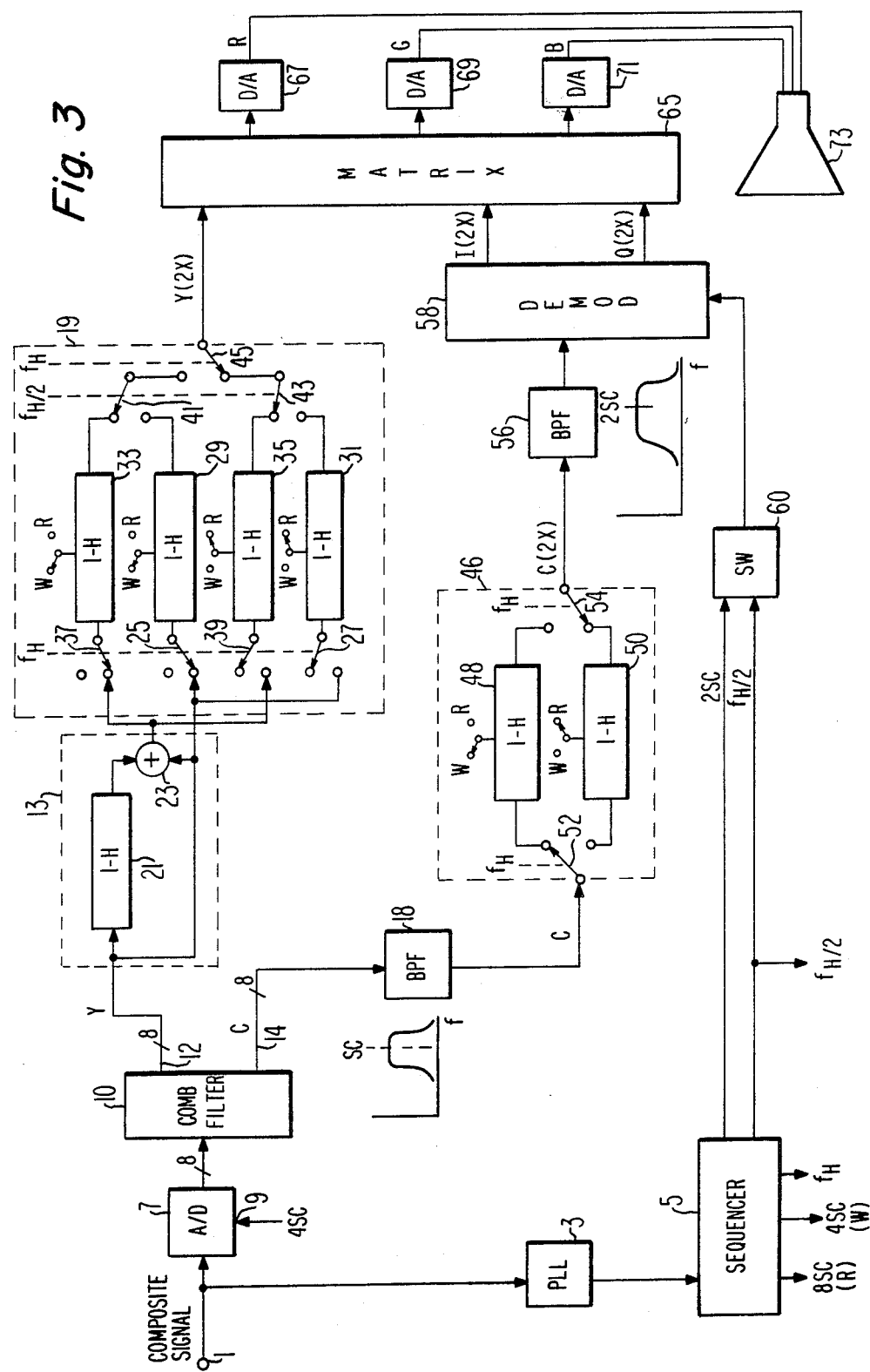
FIG 3 is a block diagram of a second embodiment of a progressive scan television receiver also arranged in accordance with the principles of the present invention.

The arrangement of FIG. 3, as was the case with respect to FIG. 1, produces 525-line progressively scanned non-interlaced video for each 262line field of interlaced incoming video. By performing the two-times speed-up of the chrominance signal prior to demodulation as described in FIG. 3 less memory is required (a pair of 1H delays may be eliminated). However, such an arrangement requires that the demodulation be accomplished with a reference carrier that is doubled in frequency. That requires that the phase of the demodulation reference subcarrier or the input chrominance must be switched 180° after every two-line sequence of the twice-rate chrominance signal.

Other embodiments of this invention which are not described in the detailed description may fall within the scope of the claims herein. In particular, the interpolation process in the luminance channel may employ a more complex process than the two-point interpolation. For example, a four-point (3, 1H memories) could be used. A four-point system, for example, would provide an improved filter function (less loss of vertical detail, however, at the expense of additional memory). By interpolating the luminance channel, a filter function having a null at the 30 Hz temporal frequency is provided, resulting in the elimination of inter-line break-up with motion along with a small reduction in inter-line flicker and a minimum loss of vertical detail. The vertical detail loss, however, may be somewhat alleviated subjectively by applying vertical detail enhancement in accordance with U.S. patent application No. 526,702 filed concurrently herewith in the names of D. H. Pritchard and W. E. Sepp.

What is claimed is:

1. A color television system for producing a progressively scanned image, comprising:
a source of composite television signal representing luminance and chrominance information of an image raster-scanned in an interlaced fashion;
comb filter means having an input coupled to said source for receiving said composite television signal, having a first output for providing a comb filtered luminance component signal and having a second output for providing a comb filtered chrominance signal;
luminance time-compression means coupled to said first output of said comb filter means for dividing the duration of each line of the comb filtered luminance component signal by a first predetermined factor;
chrominance time-compression means coupled to said second output of said comb filter means for reducing the time duration of each line of the comb filtered chrominance component signal by a second predetermined factor forming a time-compressed comb filtered chrominance component signal and for replicating without averaging each line of said time-compressed comb filtered chrominance component signal to form a continuous stream of time-compressed comb filtered and replicated chrominance component signals;
interpolating means coupled to receive said comb filtered luminance component signal for generating lines of said signals representative of an estimate of signals which would represent the image between time-successive lines of the signals of said source of television signals; and
display means coupled to said luminance and chrominance time-compression means and to said interpolating means for displaying, by progressive scanning, lines of video derived from said chrominance time-compression means and from said luminance interpolation and time-compression means.

2. The system according to claim 1 wherein said first and second predetermined factors are equal.

3. The system according to claim 2 wherein said predetermined factors are equal to two.

4. The system according to claim 3 wherein said interpolating means is coupled between said comb filter means and said luminance time compression means.

5. The system according to claim 4 wherein said luminance time compression means includes at least four 1-H FIFO buffers.

6. The system according to claim 5 wherein said interpolating means comprises at least one 1-H delay line.

7. A color television display for producing a progressive scanned image, comprising:
a source of composite television signals representing luminance and chrominance information of an image raster-scanned in an interlaced fashion;
comb filter signal for providing, comb filtered luminance component signal and comb filtered chrominance component signal representative of said image;
interpolating means coupled to receive said comb filtered luminance signal from said comb filter signal separating means for generating lines of estimated luminance signals representative of an estimate of luminance signals which would represent the image between time-successive lines of the signal of said source of television signals;

luminance time compression means sequentially coupled to said comb filter signal separating means and said interpolating means for dividing the duration of each line of said comb filtered luminance signals and said estimated luminance signal by a first predetermined factor;

chrominance time compression means coupled to said comb filter signal separating means for dividing the duration of each line of said comb filtered chrominance signals by a second predetermined factor forming comb filtered time compressed chrominance signals and for replicating without averaging each line of said comb filtered time compressed chrominance signals to form a continuous stream of comb filtered time compressed replicated chrominance signals;

demodulator means coupled to said chrominance time compression means for demodulating said continuous stream of comb filtered time compressed replicated chrominance signals to time compressed baseband quadrature chrominance signals; and display means coupled to said luminance time compression means and to said demodulator means for displaying, by progressive scanning, lines of video derived from said demodulating means and from said luminance time compression means.

8. The display in accordance with claim 7 wherein said television signals are composite color television signals, said luminance being luminance components of said composite signal and said chrominance signals being chrominance components of said composite signal.

9. The display according to claim 8 wherein said first and second predetermined factors are equal.

10. The display according to claim 9 wherein said predetermined factors are equal to two.

11. The system according to claim 10 wherein said luminance time compression means includes at least four 1-H FIFO buffers.

12. The system according to claim 11 wherein said chrominance time compression means includes at least two 1-H delay lines.

13. The system according to claim 12 wherein said interpolating means comprises at least one 1-H delay line.

14. In a color television system for producing a progressively scanning image a method for providing progressively scanned signal, comprising:

supplying composite television signal representing luminance and chrominance of an image raster-scanned in an interlaced fashion;

comb filtering said composite television signal to produce a comb filtered luminance component and a comb filtered chrominance component;

time compressing said comb filtered filtered luminance component such that the duration of each line of said comb filtered luminance component is divided by a first predetermined factor;

time compressing said comb filtered chrominance component such that the time duration of each line of the comb filtered chrominance component is divided by a second predetermined factor forming time-compressed chrominance signals;

replicating without averaging each line of said time-compressed chrominance signals such that a continuous stream of time-compressed replicated chrominance-representative signals are formed;

interpolating said luminance-representative signals such that lines of signals are formed which are representative of an estimate of signals which would represent the image between time-successive lines of said television signal; and displaying, by progressive scanning, lines of time-compressed luminance and time-compressed replicated chrominance signals on a display.

15. A progressive scan display system, comprising:

comb filter means having an input for receiving a composite video input signal having a given line rate, having a first output for providing a comb filtered luminance output signal and having a second output for providing a comb filtered chrominance output signal;

first signal processing means coupled to said first output of said comb filter means for providing a processed luminance output signal having a line rate double said given line rate with every other line being comb filtered and interpolated and with intermediate lines being comb filtered and not interpolated;

second signal processing means coupled to said second output of said comb filter means for providing a processed chrominance output signal having a line rate double said given rate by repeating each line of said comb filtered chrominance output signal without interpolation; and display means coupled to said first and second processing means for displaying said processed luminance and processed chrominance signals in progressive scan fashion.

* * * * *

UNITED STATES PATENT AND TRADEMARK OFFICE
CERTIFICATE OF CORRECTION

PATENT NO. : 4,583,113

DATED : 4-15-86

INVENTOR(S) : Dalton Harold Pritchard

It is certified that error appears in the above-identified patent and that said Letters Patent is hereby corrected as shown below:

```
Column 7, line 44, delete "262line" and insert
   --262 1/2-line--.

Column 8, Claim 7, line 63, after "signal" insert
   --separating means coupled to said source of signals--.
```

Signed and Sealed this

Twelfth Day of August 1986

[SEAL]

Attest:

Attesting Officer

DONALD J. QUIGG

Commissioner of Patents and Trademarks